United States Patent [19]

Jacobsen

[11] 4,122,309

[45] Oct. 24, 1978

[54] SEQUENCE GENERATION BY READING FROM DIFFERENT MEMORIES AT DIFFERENT TIMES

[75] Inventor: Christian Carl Jacobsen, Norwalk, Conn.

[73] Assignee: General Datacomm Industries, Inc., Wilton, Conn.

[21] Appl. No.: 800,808

[22] Filed: May 26, 1977

[51] Int. Cl.² ............................................. H04J 3/16
[52] U.S. Cl. .................................. 179/15 BA; 328/60
[58] Field of Search ......... 179/15 BA, 15 BV, 15 BS; 328/60, 61, 62; 307/260

[56] References Cited

U.S. PATENT DOCUMENTS 3,632,882  1/1972  Ciecierski et al. ............. 179/15 BA
3,855,422  12/1974  Cadiou et al. .................. 179/15 BA

*Primary Examiner*—Douglas W. Olms
*Attorney, Agent, or Firm*—Pennie & Edmonds

[57] ABSTRACT

A method and apparatus are described for generating a sequence of signals using first and second read-only memories, a counter associated with each memory as an address register, a source of timing signals connected to the input of each counter, decoding apparatus for the output of each memory and control logic to enable only one memory at a time. The two memories are organized in hierarchical fashion so that the first memory controls the second. Advantageously, the first memory provides for generation of unique portions of the sequence while the second memory provides for generation of repeated portions of the sequence.

25 Claims, 2 Drawing Figures

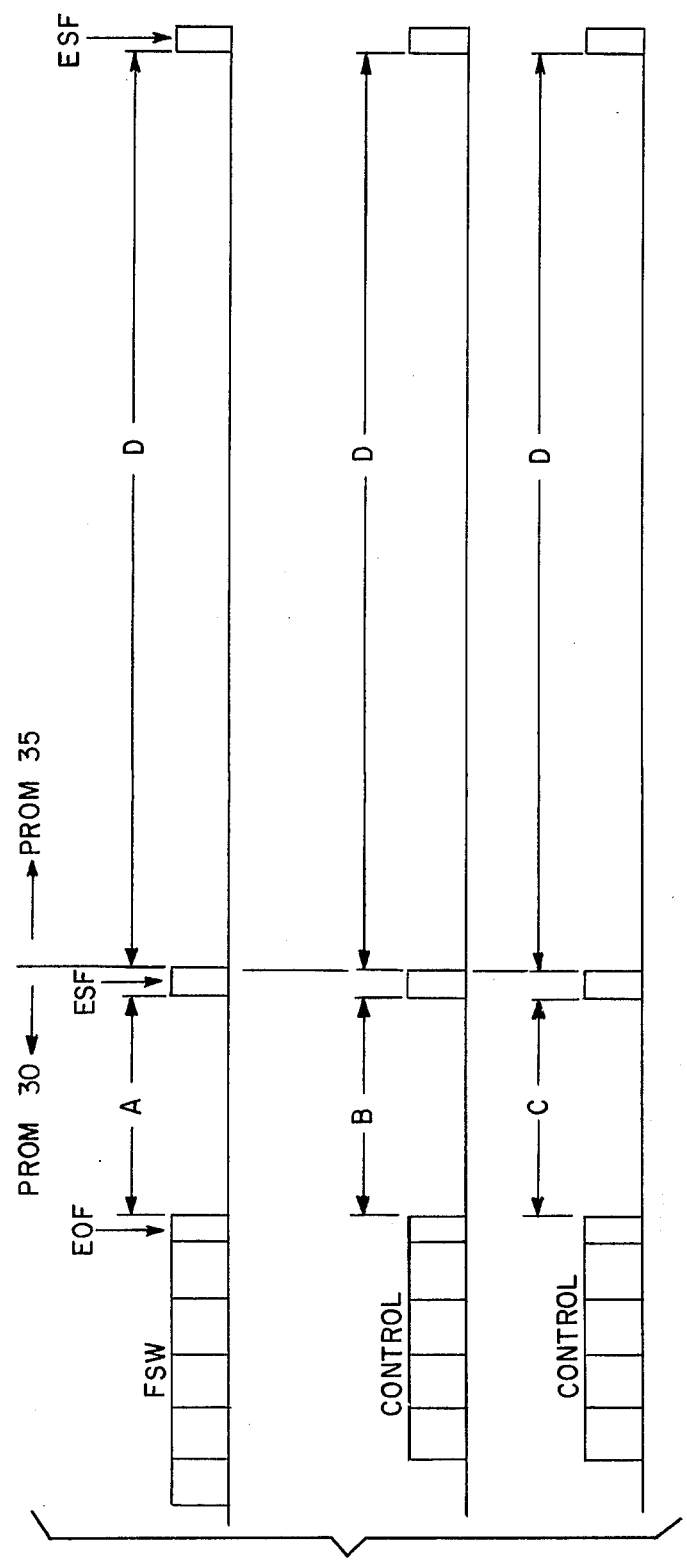

SEQUENCE GENERATION BY READING FROM DIFFERENT MEMORIES AT DIFFERENT TIMES

BACKGROUND OF THE INVENTION

The preferred application of the sequence generator of this invention is in the control of a time division multiplexer (TDM) and the invention will be described in that context. It is to be understood, however, that this description is by no means limiting and that the sequence generator may be used in numerous other situations.

In a typical TDM system, a transmitter samples pulse signals of relatively low pulse repetition frequency from various data sources or channels and interleaves them with one another to form a composite data stream that is transmitted at high speed to a remote receiver. Ordinarily, the TDM transmitter inserts the signals representative of a single bit or a single character in a single time slot in the composite data stream and interleaves the signals from different channels on a bit-by-bit or character-by-character basis so that adjacent time slots contain signals from different channels. However, different size blocks of signals could be used if desired. At the receiver, the individual bits or characters are separated from one another and allocated to various low frequency data channels similar to those at the transmitter.

To permit proper decoding of the data stream at the receiver, the transmitter interleaves the signals from the various data channels in accordance with a fixed schedule which it repeats endlessly and the receiver uses the same schedule to decode the data stream. Each cycle of the schedule is called a frame. In addition to data signals, each frame ordinarily includes a synchronization signal called a frame sync word and various control signals. Typically, the synchronization and control signals take up a small portion (less than 5%) of the total frame which is referred to as the overhead. To simplify the generation of the signals used to select the particular data channel from which a bit or character is to be transmitted, it is customary to sample the data channels in a fixed pattern which is repeated numerous times within each frame. Each such cycle of repetition is called a subframe and there are an integral number of subframes per frame.

While the use of subframes makes it feasible to design circuitry that will sample a series of data channels at a relatively high rate, the repetitious nature of the subframes means that each channel will be sampled at a rate equal to the product of the number of subframes per frame and the number of times the channel is sampled in the subframe. In some cases, however, it may be desirable to sample at a rate which is not an integer multiple of the number of times a channel is sampled in a subframe. In other cases the need for sampling a given channel may be so small that it does not warrant sampling it at all in each subframe. For example, the data rate in the channel may be less than the number of subframes generated per second. In such instances it is wasteful to assign to a given channel more time slots that are necessary to transmit the available data.

SUMMARY OF THE INVENTION

To provide greater flexibility in data transmission using the simplest available equipment and the most efficient use of the communication system, I have devised a sequence generator that comprises first and second memories, an address register for each memory, and control logic that enables an output from only one memory at a time. Advantageously, the output signals from the memories are in binary format and a decoder is used to convert these signals to a sequence of signals on a group of channel select lines and control lines. Each address register is preferably a counter to which is applied a series of timing signals.

The two memories are structured in hierarchical fashion so that the first memory is read only once in the period of time the second memory is read a plurality of times. Advantageously, the second memory provides for the generation of a highly repetitive series of signals which are used to sample high speed data channels. The first memory provides for the generation of sync and control signals and the generation of those portions of the sequence of output signals which are not repetitive. Thus, the signals from the first memory can be used to sample low speed channels or to provide a capability of achieving channel select rates that are not integer multiples or rational fractions of other channel select rates in the frame.

Advantageously, the memories are read-only memories and can readily be replaced by other read-only memories to permit the generation of different output sequences.

BRIEF DESCRIPTION OF THE DRAWING

These and other objects, features and elements of the invention will be more readily apparent from the following detailed description in which:

FIG. 2 is an illustrative representation of a frame of data that can be formed with the apparatus of FIG. 1.

DETAILED DESCRIPTION OF THE INVENTION

Figure 1:
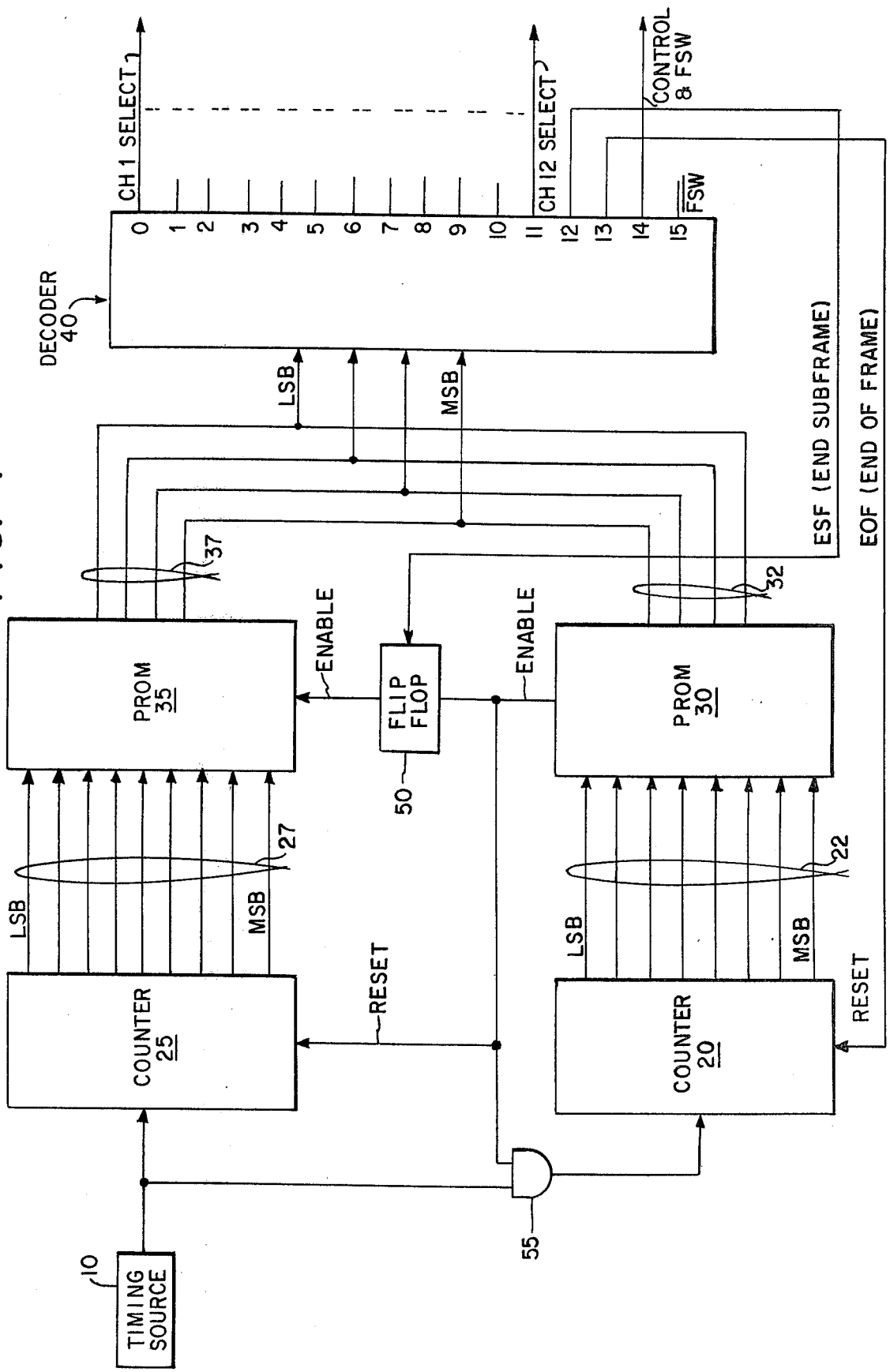
FIG. 1 is a simplified block diagram of an illustrative embodiment of the invention.

Simplified block diagrams of an illustrative TDM system, a TDM transmitter and a TDM receiver are set forth in FIGS. 1, 2 and 3, respectively, of U.S. Pat. No. 3,632,882 for "Synchronous Programmable Mixed Format Time Division Multiplexer," which is incorporated herein by reference. As shown therein, a plurality of pulse data sources or channels A–X are connected by transmitter multiplexer 100 in time-division multiplex format via a conventional transmission system 101 to a receiver demultiplexer 102 where the interleaved data signals are separated and delivered to appropriate data sinks A–X. Since the pulse repetition rate and the number of bits per character may differ from one source to the next, the data from each source is advantageously stored in a separate buffer register prior to transmission. Data stored in each such register is shifted out by a channel shift clock signal that is applied to the register under control of a channel select signal; and the data signals from the registers are combined by OR gate 210 to produce a composite data signal. Thus the channel select signal determines the particular time slot in the composite data signal which is occupied by data from a particular channel. In similar fashion at the demultiplexer, channel select signals are supplied to AND gates 300A–300X and to AND gates 301A–301X to select the particular channel into which the shift clock signal shifts the data located at a particular time slot in the composite data signal.

As indicated in the U.S. Pat. No. 3,632,882, it is desirable to be able to vary the number of times a particular channel is sampled per frame in order to accommodate channels having different data transmission rates. While the U.S. Pat. No. 3,632,882 does provide such capabilities, it is specifically designed for a character interleaved system which provides for efficient data transmission when the number of bits per character differs between different channels and it does not address itself to a communication system using subframes.

An illustrative embodiment of apparatus I have devised to provide increased flexibility in data transmission is set forth in FIG. 1. The apparatus comprises a timing source 10; first and second binary counters 20, 25; first and second programmable read-only memories (PROMs) 30, 35; a decoder 40; a flip flop 50 and an AND gate 55.

Timing source 10 is simply an oscillator which produces a sequence of timing pulses. Since each pulse ultimately produces a signal on a channel select line, the pulse rate of the timing pulses must be the same as the data rate in the high speed multiplexed communication channel such as transmission system 101 of the U.S. Pat. No. 3,632,882. Advantageously, the pulse rate of the timing source is variable to accommodate communication channels having different data rates. Timing source 10 is connected directly to binary counter 25 and is connected via AND gate 55 to binary counter 20.

Each counter is a conventional cascade of flip-flops with a single input line from timing source 10 and a plurality of parallel output lines, 22, 27, one from each flip-flop representing one bit in the binary code of the count stored in the counter. Thus, each counter can step the parallel output signal through a series of possible values in response to a series of serial input signals from timing source 10. The counters are also provided with a reset terminal which resets them to their initial value which typically is zero. In the preferred embodiment of the invention, the counters are 74LS193 4-bit, synchronous up-down counters such as are manufactured by Signetics. To provide a count from 0 to 255, two such 4-bit counters are cascaded together in known fashion in each of counters 20, 25. As is known in the art, when a synchronous counter is incremented, the change in the signal on its output lines occurs simultaneously on all output lines affected.

Programmable read-only memories 30, 35 are conventional 1K-bit memories with eight parallel input lines, an 8-line-to-256-line decoder, a read-only memory matrix having 256 address lines or memory locations which are addressed one at a time, and four parallel binary output lines 32, 37. When the memory is enabled, the signal on the eight input lines is decoded to activate a single address line to the memory matrix. This produces a binary output signal in parallel on the four output lines in accordance with information stored at that address in the memory matrix. In the preferred embodiment of the invention the memories are 82S129 1K-bit programmable read-only memories such as are made by Signetics. Alternatively, a 2K-bit memory having 512 address lines such a Signetics' 82S131 can be used. Of course, the counter that is used to address the memory should provide a count from 0 to 511.

As shown in FIG. 1, decoder 40 is a conventional 4-line-to-16-line decoder which converts a parallel binary signal on its four input lines to an output on one of 16 output lines. As shown, each input line to decoder 40 is connected to one of the four output lines 32, 37 of each of memories 30, 35. Of the output lines from decoder 40, 12 are channel select lines which are used to enable channel select gates in a multiplexer. Such gates are shown as elements 200A–200Z and 201A–201Z in the transmitter multiplexer 100 depicted in FIG. 2 of the U.S. Pat. No. 3,632,882 and elements 300A–300X and 301A–301X in receiver multiplexer 102 of FIG. 3 of that patent. The remaining four output lines are available for control and synchronization signalling as detailed below. In the preferred embodiment of the invention, the function of a 4-to-16 line decoder is produced by connecting two 3-to-8 line decoders in known fashion. Thus, one of the four output lines 32, 37 from memories 30, 35 is used to enable one of the decoders and disable the other and the remaining three lines are used to provide signals to be decoded by the one decoder that is operative. In the preferred embodiment of the invention, the decoders used are 74LS138 3-to-8 line decoders such as are manufactured by Signetics. Of course, if a memory is to be used having more output lines, a larger decoder must also be used.

An illustrative representation of a frame of data that can be formed with the apparatus of FIG. 1 is set forth in FIG. 2. Data is transmitted in six distinct time periods, three of which are labeled A, B and C and three of which are labeled D. The frame sync word and controls signals are also transmitted within the frame as indicated. For this illustration, the contents of memories 30, 35 are depicted in Tables I and II respectively. The left column in each of these tables gives the memory location or address line and the center column indicates the particular signals produced on the four output lines 32, 37 for each memory location addressed. The right hand column indicates the particular output line from decoder 40 that is activated from each memory location addressed.

TABLE I

| Memory Location | Output Line 1 | 2 | 3 | 4 | Function | |
|---|---|---|---|---|---|---|
| 0 | 0 | 0 | 0 | 0 | CH1 | |
| 1 | 0 | 0 | 0 | 1 | CH2 | |
| 2 | 0 | 0 | 1 | 0 | CH3 | A |
| 3 | 0 | 0 | 1 | 1 | CH4 | |
| 4 | 1 | 1 | 0 | 0 | ESF | |
| 5 | 1 | 1 | 1 | 0 | CONTROL | |
| 6 | 1 | 1 | 1 | 0 | CONTROL | |
| 7 | 1 | 1 | 1 | 0 | CONTROL | |
| 8 | 1 | 1 | 1 | 0 | CONTROL | |
| 9 | 1 | 1 | 1 | 0 | CONTROL | |
| 10 | 0 | 1 | 0 | 1 | CH6 | |
| 11 | 0 | 1 | 1 | 0 | CH7 | B |
| 12 | 0 | 1 | 1 | 1 | CH8 | |
| 13 | 1 | 1 | 0 | 0 | ESF | |
| 14 | 1 | 1 | 1 | 0 | CONTROL | |
| 15 | 1 | 1 | 1 | 0 | CONTROL | |
| 16 | 1 | 1 | 1 | 0 | CONTROL | |
| 17 | 1 | 1 | 1 | 0 | CONTROL | |
| 18 | 1 | 1 | 1 | 0 | CONTROL | |
| 19 | 0 | 0 | 1 | 1 | CH4 | |
| 20 | 0 | 0 | 1 | 0 | CH3 | C |
| 21 | 0 | 0 | 1 | 1 | CH4 | |
| 22 | 0 | 0 | 1 | 0 | CH3 | |
| 23 | 1 | 1 | 0 | 0 | ESF | |
| 24 | 1 | 1 | 1 | 0 | FSW | |
| 25 | 1 | 1 | 1 | 0 | FSW | |
| 26 | 1 | 1 | 1 | 1 | FSW | |
| 27 | 1 | 1 | 1 | 0 | FSW | |
| 28 | 1 | 1 | 1 | 0 | FSW | |
| 29 | 1 | 1 | 0 | 1 | EOF | |

TABLE II

| | | | | | | |
|---|---|---|---|---|---|---|
| 0 | 0 | 0 | 0 | 0 | CH1 | |
| 1 | 0 | 0 | 0 | 1 | CH2 | |
| 2 | 0 | 0 | 1 | 0 | CH3 | |
| 3 | 0 | 0 | 0 | 0 | CH1 | |
| 4 | 0 | 0 | 1 | 1 | CH4 | |
| 5 | 0 | 1 | 0 | 0 | CH5 | |
| 6 | 0 | 0 | 0 | 0 | CH1 | |
| 7 | 0 | 0 | 0 | 1 | CH2 | |
| 8 | 0 | 0 | 1 | 0 | CH3 | D |
| 9 | 0 | 0 | 0 | 0 | CH1 | |

TABLE II-continued

| | | | | | |
|---|---|---|---|---|---|
| 10 | 0 | 0 | 1 | 1 | CH4 |
| 11 | 0 | 1 | 0 | 0 | CH5 |
| 12 | 0 | 0 | 0 | 0 | CH1 |
| 13 | 0 | 0 | 0 | 1 | CH2 |
| 14 | 0 | 0 | 1 | 0 | CH3 |
| 15 | 0 | 0 | 0 | 0 | CH1 |
| 16 | 0 | 0 | 1 | 1 | CH4 |
| 17 | 0 | 1 | 0 | 0 | CH5 |
| 18 | 1 | 1 | 0 | 0 | ESF |

Let us assume that flip flop 50 is in that state which enables PROM 30 and AND gate 55. Let us also assume that an end of frame signal (EOF) has just been transmitted from decoder 40 to counter 20 to reset counter 20 to its initial output of zero. The output signal from counter 20 is decoded in PROM 30 and used to address memory location 0. As a result, in accordance with Table I, the output signal "0000" is produced on output lines 32 from PROM 30. This signal, in turn, is decoded by decoder 40 to produce an output signal on the channel 1 select line.

Upon receipt of the next signal from timing source 10, counter 20 is incremented by one. This output signal is decoded to address memory location 1. In accordance with Table I, this generates the output signal "0001" on the output line from PROM 30 and this signal is decoded by decoder 40 to produce an output signal on the channel 2 select line. In like fashion, successive signals from timing source 10 step counter 20 through output values of 2 and 3 which result in signals on the channel 3 and channel 4 select lines.

The next timing signal increments the counter to 4. This count is decoded in PROM 30 to generate the output signal "1100." This signal, in turn, is decoded by decoder 40 to produce an end of subframe (ESF) signal which is applied to the input of flip flop 50. As a result, the flip flop changes state, disabling PROM 30 and enabling PROM 35. By disabling PROM 30, the ESF signal also turns itself off. In the apparatus used in practicing the invention, the ESF signal and the EOF signal, which turns itself off in the same fashion, are typically much shorter in duration than a time slot used for a channel select signal or a control signal. A typical duration for an ESF or EOF signal is less than 100 nanoseconds.

Since counter 25 is continually reset when PROM 30 is enabled, the change in signal leaves counter 25 at its initial value which illustratively is zero. Counter 20, however, remains at count 4. The initial value of counter 25 is read by PROM 35 and, as shown in Table II, is decoded to address memory location 0. This produces the output signal "0000" on output line 37 from PROM 35. This signal is decoded by decoder 40 to produce an output signal on the channel 1 select line. In like fashion, the timing signals from source 10 step the counter through the values from zero to 17 in each case producing a signal which is read by PROM 35 so as to generate an output signal which is decoded by decoder 40 to produce an output on a channel select line.

When the count reaches 18 the signal that is read out of PROM 35 is "1100." This is decoded by decoder 40 to produce an ESF signal which changes the state of flip flop 50. As a result, PROM 30 and AND gate 55 are enabled and the next pulse from timing source 10 advances counter 20 to count 5. As shown in Table I, counts 5, 6, 7, 8 and 9 are used to produce signals on the control line from decoder 40. Thereafter, counts 10, 11 and 12 produce output signals from PROM 35 which activate the select lines for channels 6, 7 and 8. Finally, count 13 produces an ESF signal which again switches the state of the flip flop to disable PROM 30 and AND gate 55 while enabling PROM 35. At this point counter 25 has been reset to its original state. Counter 20, however, remains at count 13.

Successive counts from 0 to 18 by counter 25 result in the selection of the same sequence of channels as before; and when the count reaches 18 the ESF signal again switches the state of flip flop 50. The next count advances counter 20 to 14 and as shown in Table I, this and counts 15 through 18 result in output signals in the control line from decoder 40. Counts 19 through 22 produce output signals on the channel 3 and 4 select lines and count 23 produces an ESF signal which again changes the state of flip flop 50.

Counter 25, which had been reset to its initial state, is again advanced under the control of timing pulses from source 10 through counts 0 through 18. The ESF signal produced by count 18 again switches the state of flip flop 50 and counter 20 resumes counting. The first timing pulse received advances the counter to 24 which produces an output signal on the control line from decoder 40 as do counts 25 through 28. The signals that are generated at counts 24 through 28 may also be used by apparatus (not shown) as the frame sync word (FSW). Finally, upon reaching count 29 the EOF signal is generated which resets the counter to its initial state.

From the foregoing description, it will be appreciated that memory 30 provides for the generation of a first portion of the entire sequence of channel select signals used in the frame while memory 35 provides for the generation of a second portion of the entire sequence of channel select signals. Moreover, while the memory 30 is read only one during the generation of the entire sequence, memory 35 may be read once or a plurality of times.

As will be evident, the foregoing example is only illustrative of the operation of the invention. Typically, the frame lengths will be much greater than that depicted in FIG. 2 and the number of repetitions of the sequence generated by memory 35 will be much higher. Moreover, myriad frame configurations can readily be implemented using the two PROMS and the teaching of my invention.

Those skilled in the art will recognize that the teaching of my invention is not limited to a two level hierarchy in which one memory is read out several times during the period it takes to read out the other. For example, a three layer structure can easily be implemented in which the first memory is read perhaps 5 times during each reading of the second memory and the second memory is read perhaps 3 times during each reading of the third memory with the result that the first memory is read 15 times in the course of reading the second memory 3 times and the third memory once. Even more elaborate hierarchies can be used if desired.

The particular apparatus described is preferred but it will be recognized that there are numerous alternatives. Counters, memories and decoders of different capacities can readily be used to meet different operating requirements. Of course, efficient use of the equipment requires that the capacity of the counter equal the number of address lines to the memory and the number of output lines from the memory equal the number of lines that can be decoded by the decoder. It is not necessary that the first and second memories, or the counters associated with them, be the same size. In some devices manufactured in accordance with the invention, the first memory, which is read only once during the generation of a frame, is a 1K-bit memory while the second memory, which is a read a plurality of times, is a 2K-bit memory. Advantageously, the size of the counters is varied accordingly. In applications where a parallel output from memories 30, 35 can be used, there is of course no need for decoder 40.

The two PROMS that are used could conceivably be two portions of the same memory; and the terms "first and second memories" as used in the claims are intended to read on such configurations. For example, a single memory can be used in which addresses 0 to 255 are assigned the role of the first memory and addresses 256 to 511 are assigned the role of the second memory. Such a memory can be addressed by two counters, similar to counters 20, 25, one of which counts from 0 to 255 and the other from 256 to 511. Such counters can be controlled in the same fashion as the apparatus of FIG. 1 except that the initial value of one of the counters is 256 instead of 0.

A single counter and a storage register can also be used in place of two counters. In such a case, the count that would otherwise be retained in counter 20 while counter 25 is counting is simply transferred to the storage register upon receipt of an end of subframe (ESF) signal and the counter is set to an initial value. Upon receipt of the next ESF signal, the contents of the storage register are preset in the counter and counting resumes.

While the invention preferably is implemented using programmable read-only memories which can be readily changed as the circumstances dictate to provide different channel select signals, more permanent read-only memories could be used and merely replaced as circumstances change. While it is necessary to be able to read the memory, the memory need not be limited to a read-only memory and read-write memories are perfectly acceptable for use with the invention.

As will be apparent to those skilled in the art numerous other apparatus and methods may be used in the practice of the invention.

What is claimed is:

1. In a data communication system for multiplexing or demultiplexing a plurality of channels, apparatus for generating a sequence of channel select signals comprising:

first and second memory address registers, each of said registers further comprising means for receiving an input signal and a reset signal, means for producing an output signal, means for stepping said output signal through a series of possible values in response to a series of input signals and means for restoring said output signal to an initial condition in response to the reset signal;

a first memory comprising means for receiving the output signal from said first memory address register and for producing an output signal in response thereto, a different output signal being produced in response to at least some different signals from said register;

a second memory comprising means for receiving the output signal from said second memory address register for producing an output signal in response thereto, a different output signal being produced in response to at least some different signals from said register;

a decoder for decoding the output signals from said first and second memories to produce channel select signals, the output signals from the first memory being used to generate a first portion of the entire sequence of channel select signals and the output signals from the second memory being used to generate a second portion of the entire sequence of channel select signals;

a control device connected to said first and second memories for providing at any interval in time an output signal from only one of said memories, said control device comprising means responsive to a control signal from the first memory to enable an output signal from said second memory and responsive to a control signal from the second memory to enable an output signal from said first memory;

means for applying a reset signal to the first address register once for each entire sequence generated so that the first portion of the entire sequence is generated only once during the generation of the entire sequence; and means for applying a reset signal to the second memory address register a plurality of times during the generation of the entire sequence so that the second portion of the entire sequence is generated a plurality of times during the generation of the entire sequence.

2. The apparatus of claim 1 wherein the decoder also decodes some of the output signals from said first and second memories to produce the control signals from said first and second memories which are used to enable said memories.

3. The apparatus of claim 1 further comprising a timing source which provides the input signals to said first and second memory address registers.

4. The apparatus of claim 1 wherein the means for applying a reset signal to the second memory address register resets it to its initial value at least once for each time output signal generation is enabled from the second memory.

5. The apparatus of claim 1 wherein the first and second memory address registers are counters and the control device is a flip-flop which has first and second output states.

6. The apparatus of claim 1 wherein the control device is a flip-flop which has first and second output states which provide said control signals to said memories, an output signal being enabled from one memory when the flip-flop is in one output state and from the other memory when it is in the other output state.

7. The apparatus of claim 6 wherein said second memory address register is reset to its initial value at least once for each time the flip-flop enables the second memory.

8. The apparatus of claim 6 wherein the input to said first memory address register is enabled by the flip-flop only when the first memory is enabled.

9. The apparatus of claim 6 wherein the first output state of the flip-flop enables the input to the first memory address register, resets the second memory address register and also enables the first memory and the second output state of the flip-flop enables the second memory.

10. In a data communication system for multiplexing or demultiplexing a plurality of communication channels, a method of generating a sequence of channel select signals in which said sequence has a first portion and a second portion, said method comprising the steps of:
- providing first and second memories, each of which produces at least some different output signals in response to at least some different input signals, the output signals from said first memory being related to the signals in the first portion of said sequence and the output signals from said second memory being related to the signals in the second portion of said sequence, said first and second portions being generated at different times,
- producing a series of input signals to each of said first and second memories,
- enabling output signal generation from the first memory in response to a control signal from the second memory and enabling output signal generation from the second memory in response to a control signal from the first memory,
- said input signals to the first memory being generated once for each entire sequence so that the first portion of the entire sequence is generated only once during the generation of the entire sequence,
- said input signals to the second memory being generated a plurality of times during the generation of an entire sequence so that the second portion of the entire sequence is generated a plurality of times during the generation of the entire sequence; and
- decoding the output signals from said first and second memories to produce channel select signals.

11. The method of claim 10 wherein the step of decoding the output signals further comprises the decoding of some of the output signals to produce the control signals from said first and second memories which are used to enable said memories.

12. The method of claim 10 wherein the step of producing a series of input signals to said first and second memories comprises the steps of applying a series of clock signals to at least one counter and applying an output of said counter, or counters, to said first and second memories.

13. The method of claim 10 wherein the step of producing a series of input signals to said first and second memories comprises the steps of applying a series of clock signals to first and second counters and applying the output of said first counter to said first memory and the output of said second counter to said second memory.

14. The method of claim 13 wherein the means of producing a series of input signals to said first and second memories further comprises the step of resetting one of said counters to its initial value at least once for each time output signal generation is enabled from the memory to which said counter's output is applied.

15. The method of claim 14 wherein the other of said counters is reset only after generation of an entire sequence of channel select signals.

16. A sequence generator comprising:
- first and second memory address registers, each of said registers further comprising means for receiving an input signal and a reset signal, means for producing an output signal, means for stepping said output signal through a series of possible values in response to a series of input signals and means for restoring said output signal to an initial condition in response to the reset signal;
- a first memory comprising means for receiving the output signal from said first memory address register and for producing an output signal in response thereto, a different output signal being produced in response to at least some different signals from said register, said first memory providing for the generation of a first portion of an entire sequence of signals as the output signal from said first register is stepped through a series of values;
- a second memory comprising means for receiving the output signal from said second memory address register for producing an output signal in response thereto, a different output signal being produced in response to at least some different signals from said register, said second memory providing for the generation of a second portion of the entire sequence of signals as the output signal from said second register is stepped through a series of values;
- a control device connected to said first and second memories for providing at any interval in time a sequence generator output derived from the output signal of only one of said memories, said control device comprising means responsive to a signal from the first memory to produce an output signal from said second memory and responsive to a signal from the second memory to produce an output signal from said first memory;
- means for applying a reset signal to the first address register once for each entire sequence generated so that the first portion of the entire sequence is generated only once during the generation of the entire sequence; and
- means for applying a reset signal to the second memory address register a plurality of times during the generation of an entire sequence so that the second portion of the entire sequence is generated a plurality of times during the generation of the entire sequence.

17. The apparatus of claim 16 wherein the output signals from said memories are parallel signals on a first plurality of output lines, said apparatus further comprising a decoder for decoding the output signals from said first and second memories to produce a sequence of output signals in which each output signal is a signal on one of a second plurality of output lines.

18. The apparatus of claim 17 wherein the decoder also decodes some of the output signals from said first and second memories to produce the control signals from said first and second memories which are used to enable said memories.

19. The apparatus of claim 16 further comprising a timing source which provides the input signals to said first and second memory address registers.

20. The apparatus of claim 16 wherein the means for applying a reset signal to the second memory address register resets it to its initial value at least once for each time output signal generation is enabled from the second memory.

21. The apparatus of claim 16 wherein the first and second memory address registers are counters and the control device is a flip-flop which has first and second output states.

22. The apparatus of claim 16 wherein the control device is a flip-flop which has first and second output states which provide said control signals to said memories, an output signal being enabled from one memory when the flip-flop is in one output state and from the other memory when it is in the other output state.

23. The apparatus of claim 22 wherein said second memory address register is reset to its initial value at least once for each time the flip-flop enables the second memory.

24. The apparatus of claim 22 wherein the input to said first memory address register is enabled by the flip-flop only when the first memory is enabled.

25. The apparatus of claim 22 wherein the first output state of the flip-flop enables the input to the first memory address register, resets the second memory address register and also enables the first memory and the second output state of the flip-flop enables the second memory.

* * * * *

UNITED STATES PATENT AND TRADEMARK OFFICE
CERTIFICATE OF CORRECTION

PATENT NO. : 4,122,309
DATED : October 24, 1978
INVENTOR(S) : Christian C. Jacobsen It is certified that error appears in the above-identified patent and that said Letters Patent are hereby corrected as shown below:

Column 4, line 32, after "activated" and before "each" delete "from" and substitute therefor --for--.

Column 4, Table I, the bracket labeled A should encompass memory locations 0 through 3 instead of 0 through 4 as shown, and the bracket labeled C should encompass memory locations 19 through 22 instead of 19 through 23 as shown.

Columns 4 and 5, Table II, the bracket labeled D should encompass memory locations 0 through 17 instead of 0 through 9 as shown.

Column 6, line 35, after "only" and before "during" delete "one" and substitute therefor --once--.

Signed and Sealed this

Nineteenth Day of June 1979

[SEAL]

Attest:

RUTH C. MASON
Attesting Officer

DONALD W. BANNER
Commissioner of Patents and Trademarks